(No Model.) 2 Sheets—Sheet 1.

T. P. MOORES.
Cotton-Picker.

No. 228,101. Patented May 25, 1880.

Witnesses:
Fred. G. Dieterich
Will H. Kern

Inventor:
Thos. P. Moores
per
F. A. Lehmann,
atty.

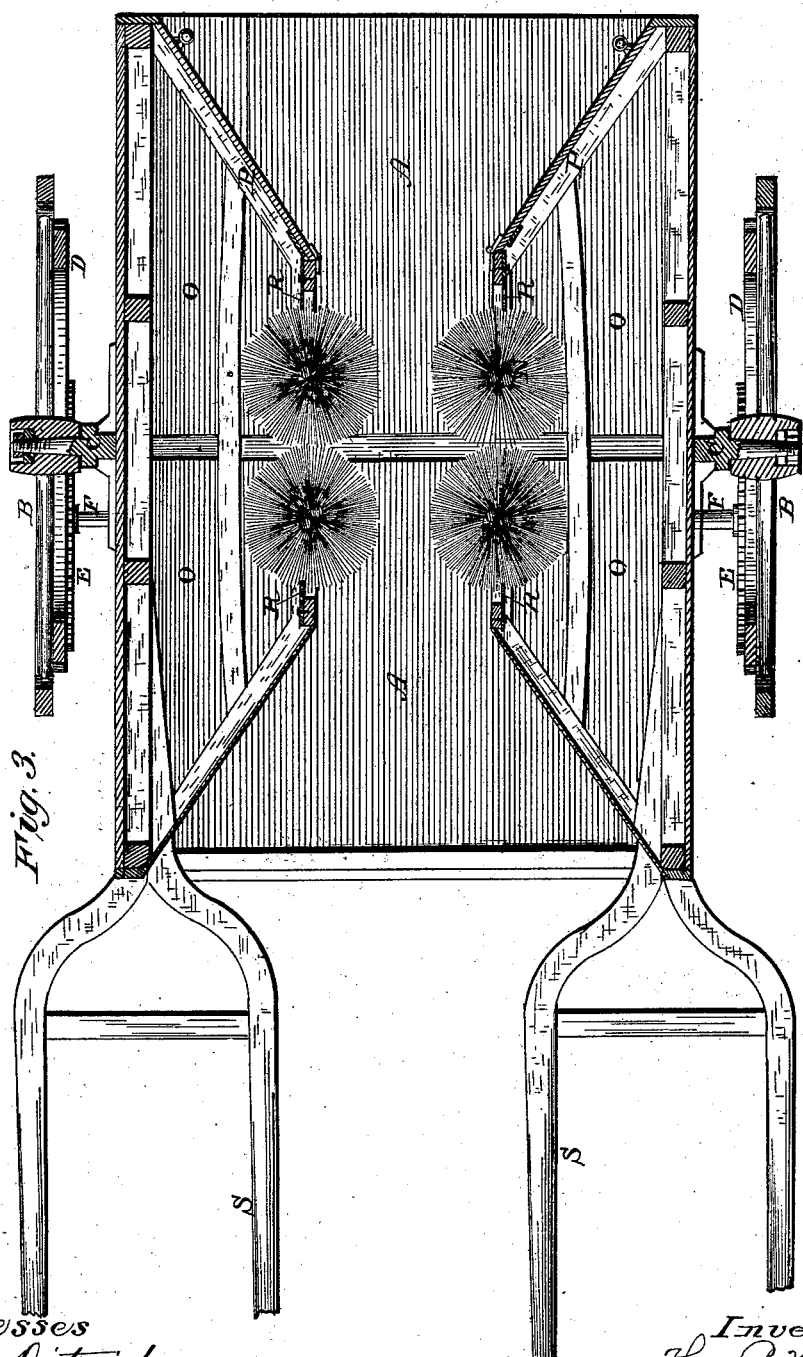

UNITED STATES PATENT OFFICE.

THOMAS P. MOORES, OF MILLIKEN'S BEND, LOUISIANA.

COTTON-PICKER.

SPECIFICATION forming part of Letters Patent No. 228,101, dated May 25, 1880.

Application filed March 15, 1880. (No model.)

*To all whom it may concern:*

Be it known that I, THOS. P. MOORES, of Milliken's Bend, in the county of Madison and State of Louisiana, have invented certain new and useful Improvements in Cotton-Pickers; and I do hereby declare the following to be a full, clear, and exact description of the invention, such as will enable others skilled in the art to which it pertains to make and use it, reference being had to the accompanying drawings, which form part of this specification.

My invention relates to an improvement in cotton-pickers; and it consists in the arrangement and combination of parts, which will be more fully described hereinafter, whereby the cotton is cleaned from the plants entirely by the action of revolving brushes as the machine is drawn along.

The object of my invention is to provide a machine for picking cotton which requires simply two horses or mules to draw it along, and which will dispense with much of the time and labor now required for this operation.

Figure 1:
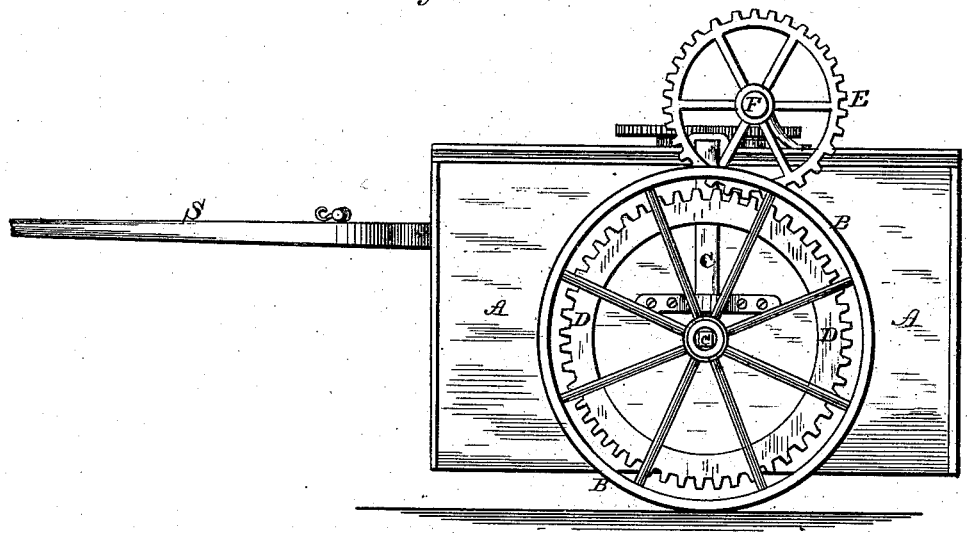
Figure 2:
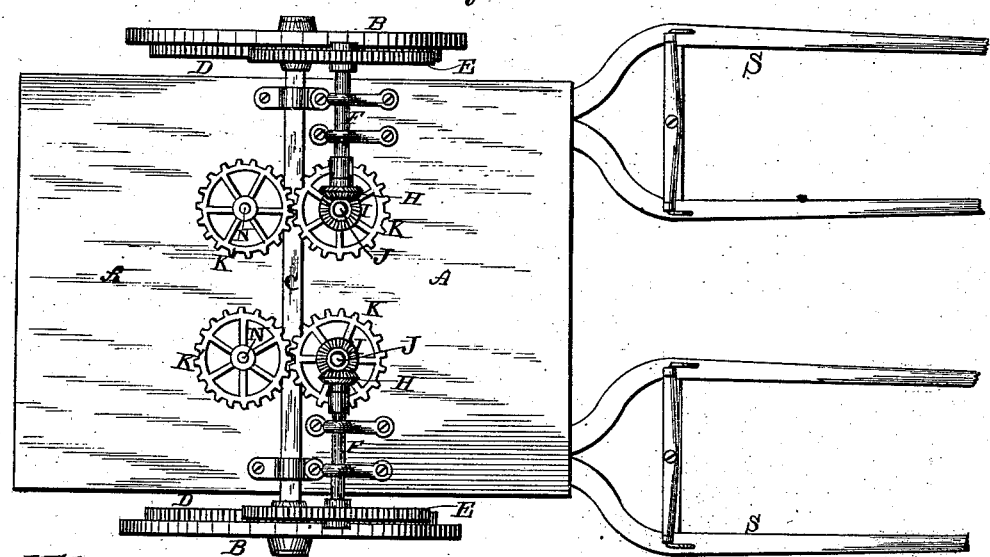

Figure 1 is a side elevation of my invention.
Fig. 2 is a plan view of the same. Fig. 3 is a horizontal section.

A represents a suitable frame, which is made of any suitable material, and constructed in any manner that may be preferred, and which is supported upon each side by a driving-wheel, B. The lower edges of the wheels project but little beyond the bottom of the frame, so that the frame will run along close to the ground, and thus gather the cotton from both large and small plants. The axle C, upon which the wheels are fastened, is made U-shaped, so as to pass up over the top of the frame, as shown, and this axle forms a brace and support for the frame. Upon the inner side of each one of these driving-wheels is placed a toothed wheel, D, which meshes with a pinion, E. These pinions are placed upon the outer ends of the short shafts F, which are journaled in suitable bearings upon the top of the frame A. To the inner ends of these short shafts are secured the beveled pinions H, which mesh with the pinions I on the vertical brush-shafts J. Also, secured to the upper end of the brush-shafts, where they project from the top of the frame A, are the gear-wheels K, which mesh with other gear-wheels, K', which are secured to similar vertical brush-shafts N. These gear-wheels, meshing together, cause the brush-shafts placed in the same side of the frame to revolve in opposite directions.

The inside of the front end of the frame A is made V-shaped, and there is left an opening entirely through the frame, so that as the machine is drawn along it will straddle over the row of cotton-plants and operate upon both sides alike.

Secured to the shafts are suitable brushes, made of wire, hair, wood, or any other suitable material, and which are so placed in the frame that as they are made to revolve by the mechanism above described the bristles, wires, or wood of the brushes will extend out into the opening that is made through the frame, and will thus act upon every branch of the cotton-plants as they are drawn in between them. The brushes upon each side, being made to revolve in opposite directions, act upon the plant first in one direction and then the other, and thus every boll is robbed of its cotton, so as to leave nothing but a little down in it, which can afterward be readily gathered by hand. As the cotton is taken from the boll by means of these oppositely-revolving brushes it is carried by the bristles into the boxes O, formed on each side of the frame, which boxes have their rear ends inclined in the same manner as their front ends, and are provided with the doors P, through which the cotton is taken out. In each box are placed the two combs R, which clean all of the cotton from the brush and deposit it in the boxes.

This machine is intended to be drawn by two animals, which are to be hitched in the shafts S, which are secured to each side of the frame, as shown, whereby one animal is made to walk on each side of the row.

The brush-shafts are preferably placed in a slightly-inclined position, so as to be nearer together at the bottom than at the top, not only because the bolls grow nearer together at the bottom of the plants, but because the axle may be caused to slightly expand or be strained or twisted, in which case the brushes will be about parallel from top to bottom.

By means of this machine cotton can be rapidly gathered, and at but a very slight expense as compared with the present system of gathering it by hand.

Having thus described my invention, I claim—

1. In a cotton-picking machine, the combination of a frame so constructed as to straddle over the top of the row, a box or chamber on each side to receive the cotton, two oppositely-revolving brushes placed in each box, which clean the cotton from the bolls and sweep it into the boxes, a comb for each brush, and a mechanism for driving the brushes, substantially as shown.

2. In a cotton-picking machine, a frame so constructed as to straddle over the top of the row, and having a closed box on each side, in combination with two oppositely-revolving brushes, which close the opening in the inner side of each box, and a comb for each brush, substantially as set forth.

3. In a cotton-picking machine, the combination of a frame, A, which straddles over the row and is made V-shaped in front, a chamber, O, on each side of the frame, two oppositely-revolving brushes placed vertically in each chamber, which brushes not only touch each other, but close the entire opening made in the inner side of each chamber, a comb for each brush, and a mechanism for driving the brushes, all arranged to operate substantially as shown and described.

In testimony that I claim the foregoing I have hereunto set my hand this 15th day of March, 1880.

THOS. P. MOORES.

Witnesses:
F. A. LEHMANN,
WILL. H. KERN.